Patented June 22, 1948

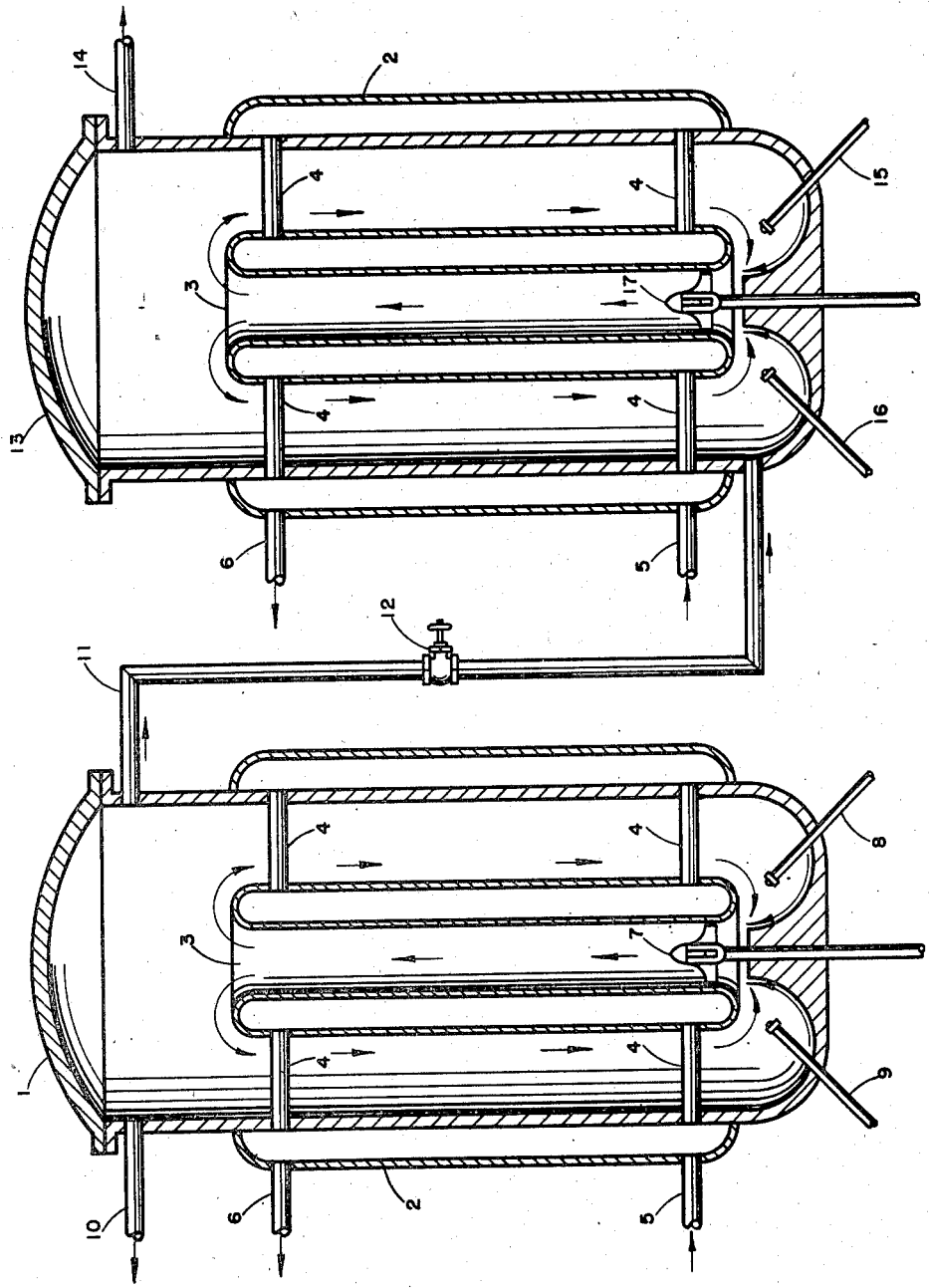

2,443,817

UNITED STATES PATENT OFFICE 2,443,817

CATALYTIC POLYMERIZATION OF HYDROCARBONS

Arthur A. Draeger, Baytown, and Henry G. Schutze, Goose Creek, Tex., assignors to Standard Oil Development Company, a corporation of Delaware Application July 10, 1944, Serial No. 544,252

1 Claim. (Cl. 260—93)

The present invention is directed to the polymerization of unsaturated hydrocarbons and particularly to those polymerization reactions conducted in the presence of a catalyst in which at the beginning of the operation there is a starting-up period during which the catalyst does not exhibit its normal activity.

In reactions involving the polymerization of unsaturated hydrocarbons, control difficulties are often encountered by reason of erratic behavior of the catalyst at different stages of the reaction. In order to enlarge upon this statement reference will be made to a specific polymerization in which this difficulty is encountered, namely, the polymerization of olefins and diolefins, such as isobutylene and isoprene, for the production of synthetic rubber.

As is known in the polymerization of isobutylene and isoprene for the production of butyl rubber the reaction is carried out in the presence of a large quantity of diluent. A circulating body of refrigerated diluent containing isobutylene and a minor amount of isoprene is established and into this body a highly diluted catalyst, such as aluminum chloride, is continuously injected. Small amounts of fresh feed make-up of diluent and olefin are continuously added and the product is continuously withdrawn. In this operation it has been observed that there is a starting-up period varying in duration with the size of the reactor and with other factors during which no polymerization occurs. It is postulated that this inactive period is caused by the presence in the circulating body of starting material of catalyst poisons which must be consumed by reaction with the catalyst before the latter begins to catalyze the polymerization of the olefins.

At the moment that reaction is initiated the relative proportions of isobutylene and isoprene in the reactor liquid are the same as that in the fresh feed. However, isobutylene and isoprene are converted at different rates and as a result the relative proportion of isoprene with respect to isobutylene in the reactor liquid increases progressively until a stable condition is reached frequently after 10 hours of operation after which the relative proportions of the two materials remain constant. The quality of the synthetic rubber produced is controlled by the composition of the reactor liquid and as a result, rubber produced prior to the establishment of the stable condition is of inferior quality.

As is known, this is an extremely sensitive reaction with respect to temperature. Careful temperature control must be practiced. Great difficulty is encountered, however, by reason of the aforesaid inactive starting period because it is practically impossible to ascertain how much catalyst poison is present and, therefore, the operator is not in a position to know when he can expect the catalyst to initiate the polymerization. As a result it is a common occurrence that, by the time polymerization actually begins, the concentration of poisons within the reactor has been reduced to a negligibly small value with the result that all of the catalyst added becomes immediately effective in promoting polymerization and as a consequence of the high olefin content of the reactor liquid an unexpectedly large quantity of heat is liberated which cannot be controlled or dissipated.

It will be understood that the proportions of reactants are carefully regulated with the thought of controlling product quality, reaction rate and liberated heat. It is possible to exercise rigid control of liberated heat by controlling the amounts and proportions of reactants once the reaction mixture becomes stable, but with the uncertainties created by the inactive starting-up period the reaction frequently gets out of hand shortly after it starts. It must be remembered that it is not necessary that the reaction run completely wild in order to cause damage. A brief period of uncontrolled temperature will usually result in the formation of sticky polymer which may plug a restricted passage in the reactor and which in any case deposits on the cooling surfaces in the reactor disrupting the essential heat transfer process and results in a continued rise in temperature which, in the ordinary case, will necessitate stopping the reaction.

In the normal operation of such process it eventually becomes necessary to shut down the reactor by reason of accumulation of deposits on cooling surfaces and/or by virtue of failure of auxiliary equipment. Each time the reaction is shut down a new starting-up period must be gone through. In large size reactors, this starting-up period may have a duration of 3 to 4 hours during which there must be extremely careful supervision. This involves a considerable loss of time and investment.

It is the principal object of the present invention to provide a mode of operation of such processes which will eliminate starting-up difficulties and at the same time increase production by eliminating starting-up periods. Briefly this is achieved by charging fresh reactants with reaction mixture which has already been brought to stable operating conditions. In some plants this may necessitate the use of an auxiliary reactor which may be brought to stable operating conditions preliminary to shutting down of the main reactor whereby when the main reactor is ready to go back on stream the reaction mixture from the auxiliary reactor can be charged to it. Preferably, however, the plant operation is conducted with a plurality of reactors whereby when it becomes necessary to shut down a given reactor its reaction mixture can be transferred to a fresh reactor and the feed of raw material and catalyst also switched to the new reactor wherein the reaction can be conducted without going through a starting-up period.

Further objects and advantages of the present invention will appear from the further detailed description of the accompanying drawing in which the single figure is a front elevation in diagrammatic form of a simplified apparatus illustrating the mode of operation of the present invention.

Referring to the drawing in detail, numeral 1 is an elongated cylindrical vessel provided with a refrigerating system including an external jacket 2 and an internal hollow annulus 3 connected together by suitable conduits 4. The outer jacket is provided with an inlet 5 and an outlet 6.

At the lower end of the annulus is arranged an agitator 7 driven from the exterior of the vessel. Also at the lower end is a suitable injection nozzle 8 for the introduction of reaction material and a second injection nozzle 9 for the introduction of catalyst. In the upper end of the reaction vessel there is provided one or more overflow lines 10 which discharge into a suitable flash tank, not shown, for the separation of product from unreacted material.

Also connected to the upper end of the vessel is a separate refrigerated overflow line 11 controlled by a valve 12 which discharges into the bottom of a second reactor 13 identical in all respects with reactor 1. It may be observed that the overflow lines 14 in the upper part of the reactor 13 will be arranged to discharge into a flash tank similar to that connected to overflow lines 10.

To consider a specific operation, the operation is begun by filling the reactor 1 with a mixture of isobutylene, isoprene and a methyl chloride, cooled to a temperature of about −138° F. The mixture will usually contain about 27 weight per cent isobutylene, 0.8 weight per cent isoprene and the remainder relatively pure methyl chloride. The mixture is circulated through the reaction vessel and a catalyst solution containing 0.1 to 0.2 weight per cent of aluminum chloride and methyl chloride of a purity in excess of 99½ per cent is slowly injected into the reaction mixture. Ordinarily, the catalyst solution will be cooled to a temperature of −125° F. before injection. If a reactor having a capacity of 12,000 pounds is employed, the feed rate of the reaction material should be adjusted so as to establish a rate of about 8,000 pounds. The catalyst feed is initially started at a rate of 250 to 300 pounds per hour and this feed rate is increased parabolically to about 800 pounds per hour in the course of 2 to 4 hours. It will be understood that the catalyst addition is increased with considerable care and with careful observation of the reactor temperature. Since it is assumed that the catalyst is initially consumed by reaction with poisons, it is desirable to feed in the quantity of catalyst required for this purpose as rapidly as possible. The beginning of the polymerization of the hydrocarbons is reflected in an abrupt temperature rise. It is important that this be checked very rapidly. If there is too much isobutylene present or too much catalyst, temperature can get out of control. By carefully regulating the feed rates of these materials, it is possible to check the abrupt rise of temperature signifying the beginning of the main reaction by cutting the catalyst feed back sharply until the temperature level is reached at which it is desirable to conduct the reaction. When this point is reached, the starting-up period may be considered complete. In a reactor of the size heretofore mentioned, this period may consume as much as 4 hours.

According to the present invention, when the reaction has continued until difficulty begins to be encountered with temperature control by reason of the deposition of polymer or other reaction product on the heat transfer surfaces, valve 12 is opened and the overflow from reactor 1 is fed to reactor 13 instead of to the conventional flash tank. In the meantime, reactor 13 has been filled with reaction material and cooled down to reaction temperature. This cold charge is in a quiescent state in this reactor so that as the overflow from reactor 1 enters the bottom of the reactor it displaces the unreacted material. When this flow has continued long enough to fill reactor 13 with a charge of substantially the same composition of that in reactor 1, the feed nozzles 8 and 9 in reactor 1 are shut off and feed nozzles 15 and 16 are placed in operation. At the same time, the agitator 17 in reactor 13 is set in motion. At this point, with the feed rates of catalyst and fresh material through nozzles 15 and 16 adjusted to correspond to those of nozzles 8 and 9 during stable operation, the reaction in reactor 13 is in the stable stage.

This procedure may be repeated as often as it is desired to change reactors. As will be apparent, the only starting-up period involved is that of the first reactor. In effect heretofore each reactor serves the function of purifying the charge for the next succeeding reactor.

It will be understood that the foregoing specific description has been given for purposes of illustration only. The present invention is applicable to any catalytic polymerization reaction where the same starting-up difficulty as that heretofore described is encountered.

The nature and objects of the present invention having been thus described and illustrated, what is claimed as new and useful and is desired to be secured by Letters Patent is:

A method for carrying out the co-polymerization of isobutylene and isoprene for the production of a rubbery co-polymer wherein a feed stock consisting of 27 weight per cent isobutylene, 0.8 weight per cent isoprene and the balance methyl chloride is admixed at a temperature substantially −138° F. with an aluminum halide catalyst dissolved in methyl chloride which comprises utilizing a plurality of reactors, continuously charging said feed stock and said catalyst to one of said reactors in regulated amounts, continuously overflowing reaction material from said reactor and recovering polymer product from said reaction materials after co-polymerization of the isobutylene and isoprene present in the feed stock has been initiated, continuing the operation in said reactor until sufficient polymer product has accumulated on the heat transfer surfaces of said reactor to prevent control of the temperature of the reaction mixture at which time the recovery of polymer product is discontinued and reaction material from said reactor is transferred to a second reactor until said second reactor carries a full charge of reaction material, and then simultaneously discontinuing the introduction of feed stock and catalyst to said first reactor and charging feed stock and catalyst to said second reactor in regulated amounts whereby the induction period in said second reactor is eliminated.

ARTHUR A. DRAEGER.
HENRY G. SCHUTZE.

REFERENCES CITED

The following references are of record in the file of this patent:

UNITED STATES PATENTS

| Number | Name | Date |
|---|---|---|
| 2,147,268 | Pyzel | Feb. 14, 1939 |
| 2,273,158 | Thomas | Feb. 17, 1942 |
| 2,356,128 | Thomas | Aug. 22, 1944 |

FOREIGN PATENTS

| Number | Country | Date |
|---|---|---|
| 483,453 | Great Britain | Apr. 20, 1938 |
| 106,371 | Australia | Jan. 26, 1939 |